H. B. SMITH.
SNAP FASTENER DEVICE.
APPLICATION FILED NOV. 28, 1919.
1,345,267. Patented June 29, 1920.
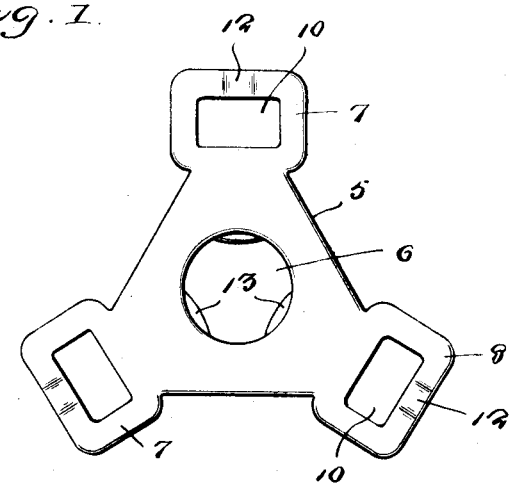
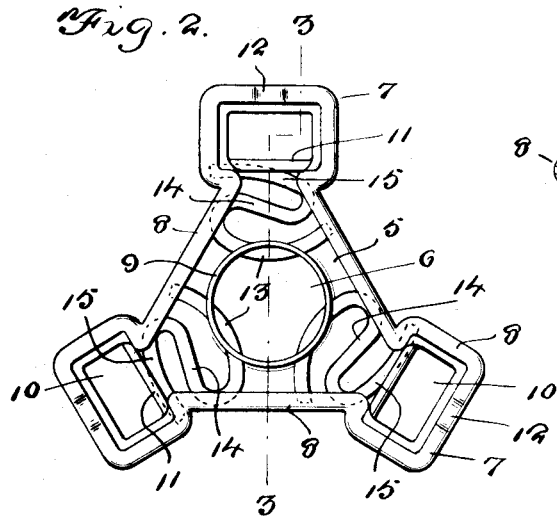
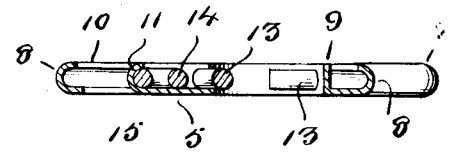
Inventor
H. B. Smith
Witnesses
By Victor J. Evans
Attorney

UNITED STATES PATENT OFFICE.

HENRIETTA B. SMITH, OF CHARLESTON, SOUTH CAROLINA.

SNAP-FASTENER DEVICE.

1,345,267.   Specification of Letters Patent.   Patented June 29, 1920.

Application filed November 28, 1919. Serial No. 340,997.

*To all whom it may concern:*

Be it known that I, HENRIETTA B. SMITH, a citizen of the United States, residing at Charleston, in the county of Charleston and State of South Carolina, have invented new and useful Improvements in Snap-Fastener Devices, of which the following is a specification.

This invention has reference to improvements in garment fasteners.

The improvement is in the nature of the female or socket member of a snap fastener for garments, and the primary object of the invention is to produce a simple, cheap and reliable construction whereby spring elements having portions which form reinforcements for the body of the socket member and other portions which partly project through the central opening in the said socket member will so engage with the shank or stud of the male member of the fastener as to insure a positive gripping engagement between the members and hold the said members against accidental disengagement.

Other objects will present themselves as the nature of the invention is better understood, reference being had to the accompanying drawings in which there is illustrated a simple and satisfactory embodiment of the improvement reduced to practice and in which:

Figure 1 is a plan view of a female or socket member of a snap fastener constructed in accordance with my invention.

Fig. 2 is a plan view looking toward the under face of the improvement.

Fig. 3 is a horizontal sectional view approximately on the line 3—3 of Fig. 2.

The body of my improvement is in the nature of a triangular plate 5 having a centrally rounded opening 6 and its corners formed with substantial rectangular extensions 7. The edges of the body 5 and its extensions 7 are bent upon themselves to provide an inwardly rounded flange 8. The wall provided by the opening 6 is extended in the same direction as the flange 8, and thus provides the center of the body plate with an annular flange 9.

The rectangular extensions 7 are provided with rectangular openings 10, and the inner longitudinal wall provided by the said openings 10 has a flange 11 extending in the same direction as the flanges 8 and 9. This flange 11 contacts with the flange 8 at the juncture of the body plate with the rectangular extensions 7.

The extensions 7 having the openings therethrough provide the eyes of the device, and the outer member of the eyes upon both the upper and lower surfaces thereof are depressed, as at 12 so as to receive therein the threads which fasten the device to a garment.

The central opening 6 is designed to receive therethrough the stud of the male member of the fastener (not shown).

The flange 9, in a line with the eyes has longitudinal slots or openings therethrough, and in these openings are the outer curved arms 13 of substantially S-shaped spring members 14. The inner arm 15 of each of the springs 14 contacts with the flange 11, while the extreme ends as well as the rounded portions of the springs are received in the channel provided by the in-curved flange 8.

It will be apparent that when the stud or head of the male member is passed through the opening 6 the same will contact with the outer rounded arms 13 of the springs 14, forcing the said arms inwardly until after the stud passes the same. The arms will then spring outwardly to engage with the stud and thus lock the male member to the female member.

What I claim is:—

In a garment fastener, a socket member comprising a substantial triangular body plate having its corners formed with slotted rectangular extensions providing eyes, the eyes and the edges of the body being flanged inwardly, the wall provided by the central opening in the body having an annular flange extending in the same direction as the body flange and the last mentioned flange having spaced openings opposite the eyes, the inner walls of the eyes being also flanged in the same direction as the mentioned flanges, S-shaped springs between the flanges of the eyes and the body flange and having their outer curved arms received in the openings in the central flange, and the eyes having their opposite faces depressed, all as and for the purpose set forth.

In testimony whereof I affix my signature.

HENRIETTA B. SMITH.